United States Patent [19]

Ohkubo et al.

[11] Patent Number: 5,622,904
[45] Date of Patent: Apr. 22, 1997

[54] GLASS MATERIAL FOR MOLDING OPTICAL ELEMENTS

[75] Inventors: Katsuyuki Ohkubo; Tomoaki Sugawara; Hiroyuki Endou; Hiroshi Ueno, all of Atsugi; Akihito Minato, Zama, all of Japan

[73] Assignee: Ricoh Company, Ltd., Tokyo, Japan

[21] Appl. No.: 396,082

[22] Filed: Feb. 28, 1995

Related U.S. Application Data

[63] Continuation of Ser. No. 42,643, Apr. 5, 1993, abandoned.

[30] Foreign Application Priority Data

| Apr. 6, 1992 | [JP] | Japan | 4-114103 |
| Sep. 25, 1992 | [JP] | Japan | 4-255173 |
| Oct. 15, 1992 | [JP] | Japan | 4-276434 |
| Feb. 12, 1993 | [JP] | Japan | 5-023940 |

[51] Int. Cl.⁶ .................. C03C 3/04; B28B 7/34
[52] U.S. Cl. .................. 501/53; 501/60; 501/74; 106/38.9
[58] Field of Search .................. 501/12, 74, 53, 501/60; 106/38.9; 65/31

[56] References Cited

U.S. PATENT DOCUMENTS

| 5,141,547 | 8/1992 | Asanuma et al. | 65/30.1 |
| 5,238,880 | 8/1993 | Inami et al. | 501/12 |
| 5,244,844 | 9/1993 | Inami et al. | 501/12 |
| 5,254,148 | 10/1993 | Inami et al. | 501/12 |

FOREIGN PATENT DOCUMENTS

| 3-252321 | 11/1991 | Japan . |
| 3-265547 | 11/1991 | Japan . |
| 4-21606 | 4/1992 | Japan . |
| 4-198031 | 7/1992 | Japan . |

*Primary Examiner*—Karl Group
*Attorney, Agent, or Firm*—Oblon, Spivak, McClelland, Maier & Neustadt, P.C.

[57] ABSTRACT

A glass material for molding an optical element and including lead and a lead compound is processed chemically and physically and includes a modificative ion component set such that an atomic concentration of the modificative ion component in a range of 600 angstroms from a glass surface layer has a concentration gradient approximated by a curve represented by the following formula (1).

$$Y = A0 + A1 \times X + A2 \times X\hat{~}2 + A3 \times X\hat{~}3 + \qquad (1)$$
$$A4 \times X\hat{~}4 + A5 \times X\hat{~}5 + A6 \times X\hat{~}6 + A7 \times X\hat{~}7 + A8 \times X\hat{~}8 +$$
$$A9 \times X\hat{~}9 + A10 \times X\hat{~}10 + e(x)$$

wherein, reference numeral Y designates an atomic concentration of a modificative ion shown by atomic percent. Reference numeral X designates a depth from an uppermost glass surface layer. Each of coefficients A0 to A10 is set to a constant. Symbol $\hat{O}$ designates a power. Reference numeral $e(x)$ designates an error component.

8 Claims, 5 Drawing Sheets

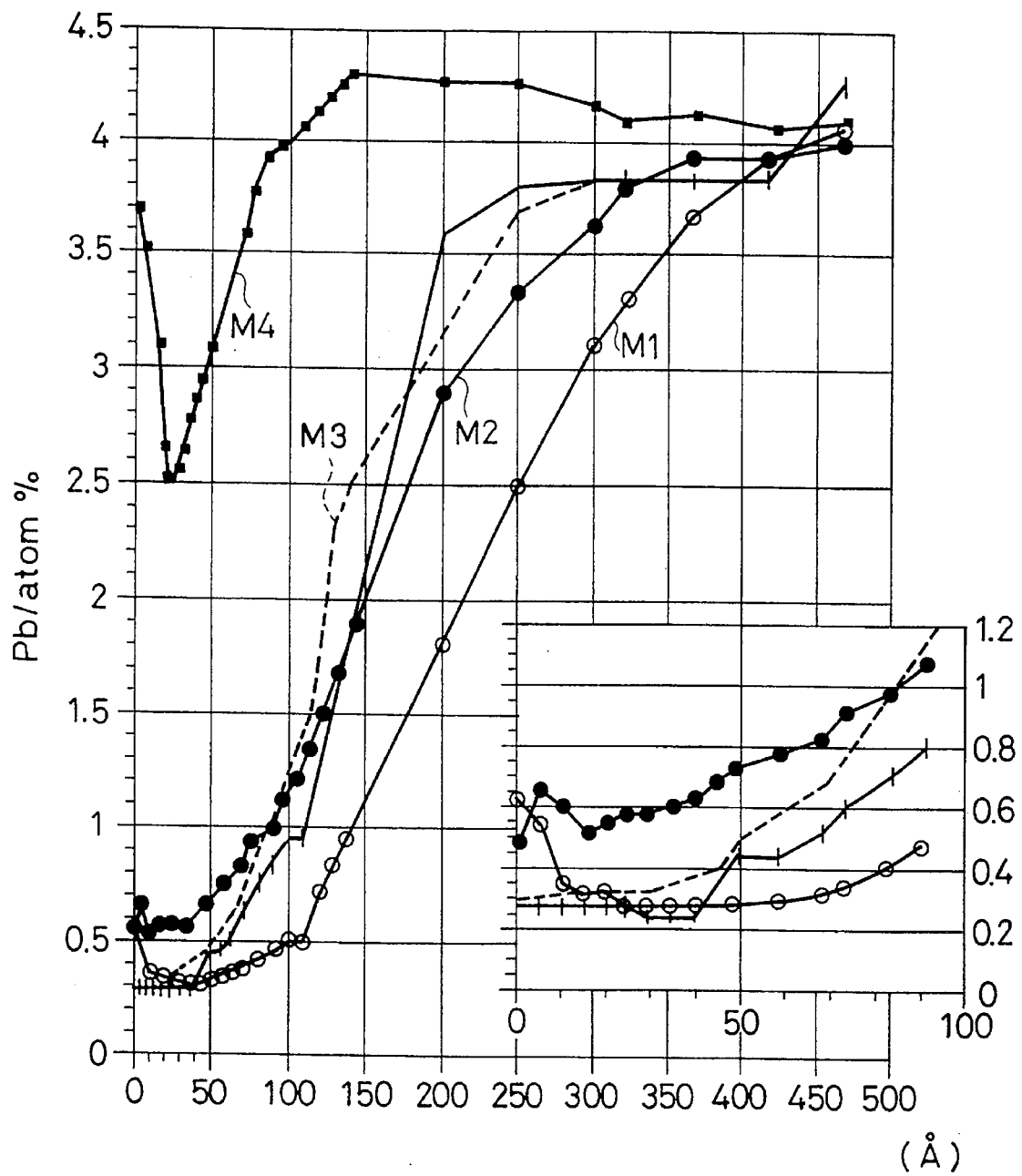

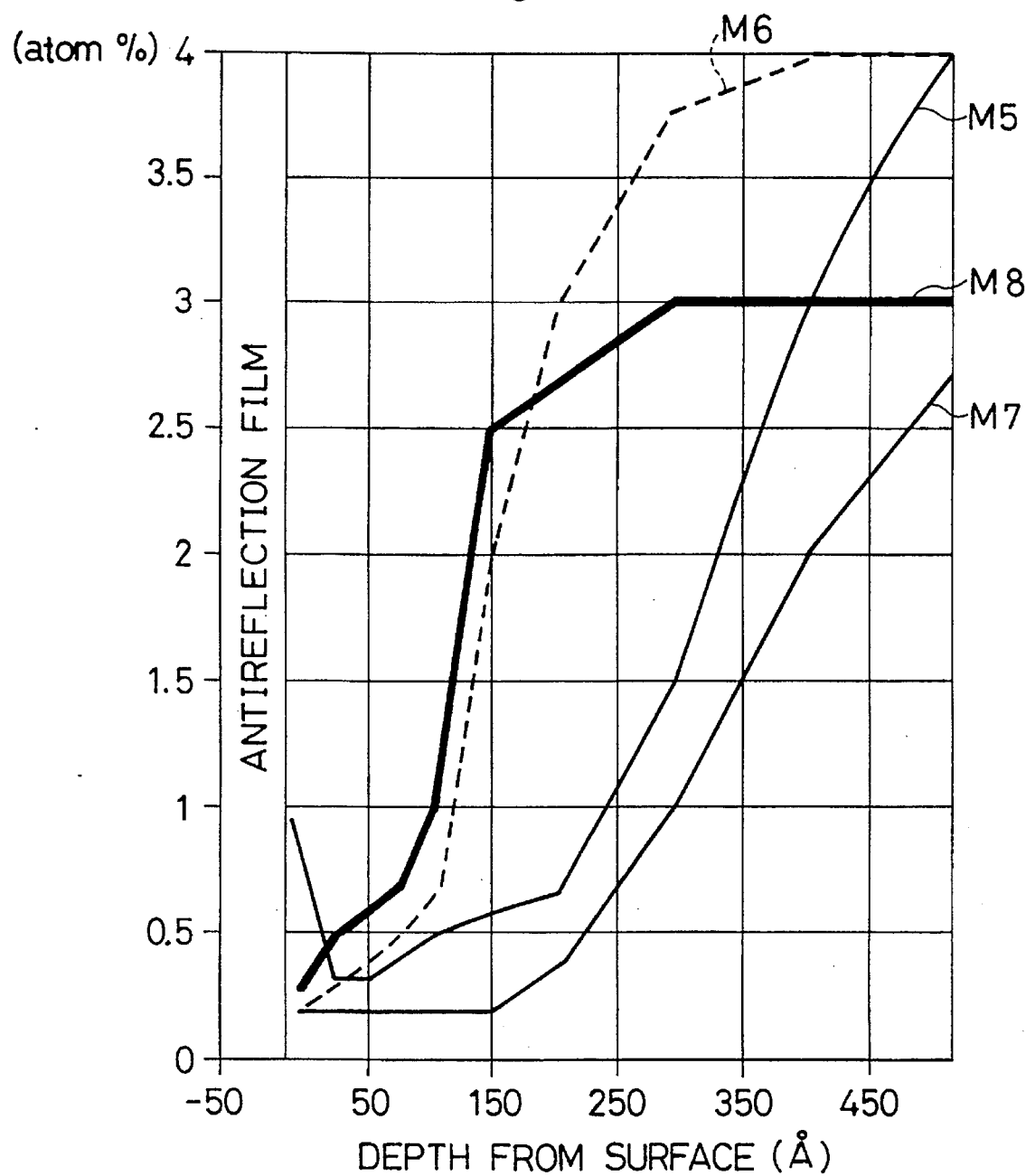

GLASS MATERIAL FOR MOLDING OPTICAL ELEMENTS

This application is a continuation of application Ser. No. 08/042,643, filed Apr. 5, 1993, now abandoned.

BACKGROUND OF THE INVENTION

1. Field of the Invention

The present invention relates to a glass material for molding an optical element, a molding product of an optical glass element and a manufacturing method thereof. Concretely, the present invention can be applied to optical parts such as a lens, a prism and a mirror, and a hybrid lens (made of plastic and glass), an optical element of X-ray glass, etc. used in a camera, a plain paper copier (PPC), a facsimile telegraph (FAX), an optical disk drive unit, etc. More particularly, the present invention relates to a glass material for molding an optical element, a molding product of an optical glass element and a manufacturing method thereof in which no lead, etc. are easily deposited from a glass element in hot press molding thereof using a die so that no lead, etc. are easily attached to the die and it is possible to restrain an accuracy in face of the die from being reduced. The molding product of an optical glass element in the present invention can be preferably used for a camera, a copying machine, a facsimile telegraph, a printer and an optical system using an optical disk, a compact disk (CD), a CD-ROM, a lens, a prism, etc.

2. Description of the Related Art

Optical elements using general glass are utilized in various kinds of fields. These optical glass elements are ground to form spherical and aspherical surfaces.

Recently, a press molding method for an optical glass element has been searched and practically used. In this press molding method, similar to plastic, etc., a glass material is heated at a temperature equal to or higher than 400 degrees. Thereafter, the glass material is pressurized to obtain an optical element having a desirable shape. In this press molding method, glass comes in contact with a die processed to have a high accuracy in shape so as to obtain the desirable optical element at a high temperature. A shape of the pressurized die is transferred to this glass. Therefore, heat resistance, acid oxidation resistance and high strength are required with respect to the die.

However, it is impossible to completely prevent the die from being deteriorated even when the die is formed by using various kinds of materials. When an optical glass element is formed by hot press molding a flint glass material having a high refractive index and a high degree of dispersion by using a molding die, ions of lead and potassium as constructional components of glass are deposited from an internal glass portion at hot press molding times. These ions are diffused onto an interface of this glass and the die and react with a small amount of reducing substances such as hydrocarbon existing on a die surface so that metallic lead and metallic potassium are formed. Thus, glass and the die are melted and attached to each other by lead and potassium deposited on the glass surface. Further, a coloring film of lead and potassium is formed on the glass surface so that this glass surface becomes opaque. When the glass surface becomes opaque, transmittance of light is reduced so that it is impossible to obtain an optical glass element having desirable optical characteristics in some cases. Further, when a coating film such as an antireflection film is formed on the glass surface in a state in which the coloring film of lead and potassium is formed on the glass surface, the coating film tends to be separated from the glass surface in comparison with a case in which the coating film is formed on a clean glass surface.

For example, Japanese Patent Publication (KOKOKU) No. 4-21606 (Japanese Patent Application Laying Open (KOKAI) No. 62-207727) shows a technique for solving the above problems. In this publication, a glass element before hot press molding is coated with an aqueous solution of hydrofluoric acid. Thereafter, the coated glass element is cleaned by water and is dried. These cleaning and drying processings are repeatedly performed. Thereafter, the glass element is processed by hot press molding. Further, for example, in Japanese Patent Publication (KOKOKU) No. 4-21606, a glass material before hot press molding is dipped into hydrofluoric acid and is then dipped into nitric acid. This glass material is cleaned by pure water and is dried. Thereafter, the glass material is processed by hot press molding. In both the above cases, a glass surface portion can be etched and a constructional component can be eluted from an internal glass portion by surface processing of the glass material using a solvent before the hot press molding. Accordingly, no glass surface easily becomes opaque and no glass is easily melted and attached onto a die after the hot press molding. However, in these cases, the glass surface is processed by only chemical processing using a solvent without any physical processing such as ultrasonic processing in the present invention as described later. Therefore, effects of this surface processing are not necessarily sufficient and a problem exists in that it is impossible to sufficiently satisfy recent severe requirements about optical characteristics by using the above method, consequently an yield of the optical glass element is reduced.

SUMMARY OF THE INVENTION

It is therefore an object of the present invention to provide a glass material for molding an optical element, a molding product of an optical glass element and a manufacturing method thereof in which no metal such as lead are easily deposited out of the interior of an optical glass element so that no metal such as lead are easily attached to the die in formation thereof by hot press molding of glass using a die and it is possible to restrain an accuracy in face of the die from being reduced, thereby extending a life of the die.

The present invention is characterized in that a glass material for molding an optical element including lead and a lead compound is chemically and physically processed and includes a modificative ion component such that an atomic concentration of the modificative ion component set in a range of 600 angstroms from a glass surface layer has a concentration gradient approximated by a curve represented by the following formula (1).

$$Y = A0 + A1 \times X + A2 \times X^2 + A3 \times X^3 + A4 \times X^4 + A5 \times X^5 + A6 \times X^6 + A7 \times X^7 + A8 \times X^8 + A9 \times X^9 + A10 \times X^{10} + e(x) \tag{1}$$

In this case, all ions of elements except for silicon and oxygen within glass are defined as modificative ions. In the above formula (1), reference numeral Y designates an atomic concentration of a modificative ion shown by atomic percent. Reference numeral X designates a depth from an uppermost glass surface layer. Each of coefficients $A0$ to $A10$ is set to a constant. Symbol $\hat{0}$ designates a power. Reference numeral $e(x)$ designates an error component.

In the present invention, the glass material includes a lead component in the modificative ion component. An atomic concentration of the lead component in the region of a depth ranged from 30 to 150 Å from the glass surface layer is preferably set to be lower than that in a region except for this region. The above region except for this region is composed of a shallow region shallower than 30 Å and a deep region deeper than 150 Å. In such a case, it is possible to more effectively confine lead diffused from the glass interior at a hot press molding time in the region of a depth ranged from 30 to 150 Å from the glass surface layer. In particular, lead is effectively confined when a large amount of lead is included in this glass. Further, the atomic concentration of the lead component is preferably set to be equal to or lower than 2 atomic percent in the region of a depth ranged from 30 to 150 Å from the glass surface layer. In this case, it is possible to efficiently confine lead diffused from the glass interior in the above region in comparison with a case in which the atomic concentration of the lead component is higher than 2 atomic percent. Accordingly, no lead component is easily deposited to the glass exterior. In this case, the atomic concentration of the lead component can be preferably recovered until an atomic concentration of a lead component of bulk at a depth ranged from 150 to 600 angstroms from the glass surface layer.

A molding product of an optical glass element in the present invention is characterized in that the molding product is formed by hot press molding the above glass material for molding an optical element and includes a lead component such that a concentration gradient of the lead component approximated by the curve represented by the formula (1) satisfies the above condition after this glass material is pressurized and molded on an optical glass face. The lead concentration of the molding product of the optical glass element after the hot press molding is changed in comparison with the lead concentration of the glass material before the hot press molding.

In the present invention, the glass material includes a potassium component in the modificative ion component. An atomic concentration of the potassium component in the region of a depth ranged from 30 to 100 angstroms from the glass surface layer is preferably set to be lower than that in a region except for this region. The above region except for this region is composed of a shallow region shallower than 30 Å and a deep region deeper than 100 Å. In such a case, it is possible to more effectively confine potassium diffused from the glass interior at hot press molding times in the region of a depth ranged from 30 to 100 Å from the glass surface layer. In particular, potassium is effectively confined when a large amount of potassium is included in this glass. Further, the atomic concentration of the potassium component is preferably set to be equal to or lower than 1.5 atomic percent in the region of a depth ranged from 30 to 100 Å from the glass surface layer. In this case, it is possible to efficiently confine potassium diffused from the glass interior in the above region in comparison with a case in which the atomic concentration of the potassium component is higher than 1.5 atomic percent. Accordingly, no potassium component is easily deposited to the glass exterior. In this case, the atomic concentration of the potassium component can be preferably recovered until an atomic concentration of a potassium component of bulk at a depth ranged from 100 to 600 angstroms from the glass surface layer.

A method for manufacturing a molding product of an optical glass element in the present invention comprises the steps of chemically and physically processing glass including lead simultaneously to obtain a concentration gradient of the lead component, and hot press molding this glass to form the molding product of the optical glass element. In this case, after the chemical and physical processings, this glass may be physically processed in an alkali aqueous solution such as sodium hydroxide, potassium hydroxide. As a result, it is possible to obtain a molding product of an optical glass element having a high quality.

In the present invention, the glass material is preferably dipped in an acidic aqueous solution such as nitric acid, sulfuric acid, hydrochloric acid, acetic acid in the above chemical processing. In this case, metal such as lead, potassium comprising in a glass can be deposited from the glass interior. When the aqueous solution of nitric acid is used, a preferable concentration of this solution is set to be equal to or smaller than an amount ranged from 0.5 to 1.0 mol in consideration of a processing speed. Further, the above physical processing is preferably processing of an ultrasonic wave or irradiating processing of a laser beam. In this case, the temperature of a glass surface portion can be efficiently increased by the ultrasonic processing or the laser beam irradiating processing in comparison with the glass interior. Accordingly, it is possible to more effectively deposit the lead component from the glass surface portion. At this time, when this glass includes an alkali metal such as Na except for potassium and a transition metal except for lead, it is assumed that, similar to lead and potassium, a concentration gradient of each of such alkali and transition metals can be provided within the glass interior. Thus, it is possible to effectively restrain metals except for lead and potassium from being attached onto a die surface. The glass material is preferably pressurized and molded in the range of a temperature from a yielding point to a temperature lower by 60 degrees than the yielding point. A more preferable temperature of the glass material is set to be a temperature ranged from the yielding point to a temperature lower by 40 degrees than the yielding point. In this case, no lead within the glass interior is easily eluted therefrom. Further, no temperature gradient of lead in the glass interior obtained by the surface processing is easily changed.

The molding product of an optical glass element in the present invention may be coated with an antireflection film made of $MgF_2$, etc. on a glass lens surface. Further, an optical face of this molding product may be coated with a coating film to form an reflecting mirror.

The following means can be preferably applied to the present invention.

In a glass material for hot press molding in the present invention, a reforming layer is formed on a surface of a glass blank used in hot press molding of an optical element to prevent metals from being attached to a die at hot press molding times. This reforming layer is preferably formed by ultrasonic wave processing of the glass blank in an acidic solution. In this case, the glass material for hot press molding is preferably constructed such that said reforming layer is formed by forming an ion eluting layer in which the glass blank lacks a modificative ion. Further, the above ion eluting layer is preferably constructed by a low ion concentration layer having a concentration of the decorative ion equal to or lower than 10% of bulk and a thickness from 50 to 150 Å, and a concentration gradient layer having a thickness from 50 to 300 Å and recovered until a metallic concentration of bulk.

The above acidic solution can be preferably constructed by an acidic aqueous solution of nitric acid, sulfuric acid, hydrochloric acid, acetic acid, etc. After the ultrasonic processing, the above reforming layer is preferably formed by additional an ultrasonic wave processing in an alkali aqueous solution such as sodium hydroxide, potassium hydroxide. Further, the reforming layer is preferably formed by irradiating a laser beam onto the glass blank in the acidic solution.

Table 1 shows concentrations of lead and potassium with respect to depths thereof from a glass surface after hot press molding in the present invention and comparing examples. Table 1 also shows state in a molding time. A molding condition is equal to that in embodiments described later.

percent in a layer until a depth of 50 Å from the above glass surface. Accordingly, the present inventions 1 to 3 in the Table 1 are preferable. In this case, in comparison with a case in which the atomic concentration of lead is higher than 0.5 atomic percent in the comparing examples 1 to 3, lead diffused from the glass interior can be efficiently confined at a hot press molding time within a small region in which the atomic concentration of lead at a depth of 50 Å from the glass surface is equal to or lower than 0.5 atomic percent. Further, in this case, no lead diffused from the glass interior

TABLE 1

| Nos. | EXAMPLE (Invention) | | | COMPARATIVE EXAMPLE | | |
| --- | --- | --- | --- | --- | --- | --- |
|  | 1 | 2 | 3 | 1 | 2 | 3 |
| Pb atom (%) (50 Å) | 0.1 | 0.3 | 0.5 | 0.6 | 1.8 | 3.8 |
| Pb atom (%) (100 Å) | 0.5 | 0.8 | 1.0 | 1.2 | 2.0 | 4.0 |
| K atom (%) (100 Å) | 0.2 | 0.4 | 0.9 | 1.1 | 1.4 | 3.0 |
| STATE IN MOLDING | preferable | preferable | preferable | Lens Slightly opaque | Lens opaque Mold fusion | Lens opeque Mold fusion |

An optical glass element including lead in the present invention preferably includes a lead component set such that an atomic concentration of lead is equal to or lower than one atomic percent in a layer until a depth of 100 Å from the glass surface. In this case, as can be seen from the present inventions 1 to 3 in the Table 1, the atomic concentration of lead is equal to or lower than one atomic percent in the layer until a depth of 100 Å from an uppermost glass surface. In these inventions 1 to 3, no glass surface becomes opaque and no lead is melted and attached to a die. In contrast to this, the atomic concentration of lead is higher than one atomic percent in comparing examples 1 to 3. In the comparing examples 1 to 3, the glass surface becomes opaque and lead is melted and attached to the die so that no optical element is practical.

Further, the atomic concentration of lead in a glass surface portion is extremely low in comparison with general cases in which no surface processing is performed and a surface of the glass material is simply processed by a solvent. Accordingly, when the optical glass element is formed by hot press molding of glass using a molding die, lead diffused from the glass interior can be efficiently confined within the region of a surface portion having a low lead concentration so that no lead is easily deposited to the glass exterior. Therefore, no glass is easily melted and attached to the die and no glass surface easily becomes opaque by the deposition of lead. Accordingly, it is possible to obtain an optical glass element having high transparency and stable optical characteristics with improved yield.

Further, a life of the die can be greatly extended so that cost per one optical glass element can be reduced. Further, chemical and mechanical durabilities on a lens surface can be improved whether the optical glass element is coated with an antireflection film, etc. or not. Namely, when the optical glass element is coated with the antireflection film, etc., it is possible to extremely restrain the coating film from being separated from the lens surface and restrain the lens surface from being opaque. In contrast to this, when no optical glass element is coated with the antireflection film, etc., it is possible to restrain phenomena of dimming, stain, etc. from being caused and improve surface hardness of the optical glass element so that a lens life can be extended.

In the present invention, in particular, the atomic concentration of lead is preferably equal to or lower than 0.5 atomic is easily deposited to the glass exterior. As can be seen from the Table 1, no glass surface becomes opaque and no glass is melted and attached to a die in the present inventions 1 to 3 each showing a lead concentration equal to or lower than 0.5 atomic percent at a depth of 50 Å. In contrast to this, the glass surface becomes opaque and glass is melted and attached to the die in the comparing examples 1 to 3 each showing a lead concentration equal to or higher than 0.5 atomic percent so that no optical glass element is practical. In the above Japanese Patent Publication (KOKOKU) No. 4-21606 showing a general optical glass element, the concentration of a constructional component such as lead and potassium tending to be evaporated is set to 0.01 to 0.9 percent of the entire glass material at a depth equal to or shallower than 1000 Å. However, when the entire glass material has a constructional component having a concentration of 10 atomic percent and tending to be evaporated, a constructional component having a concentration from 0.1 to 9 atomic percent and tending to be evaporated exists at a depth equal to or shallower than 1000 Å. However, these concentration values are provided before molding of the glass material. Accordingly, the component concentration is apparently set to be higher than these concentration values by thermal diffusion after molding. Accordingly, there is no problem if the component concentration is equal to or lower than 0.1 atomic percent as in the present inventions 1 to 3. However, in known examples, the component concentration is apparently higher than 0.1 atomic percent after molding, accordingly, similar to the above comparing examples 1 to 8, a problem exists in that a glass surface becomes opaque and glass is melted and attached to a die.

In the present invention, the glass material preferably includes a potassium component set such that an atomic concentration of potassium is equal to or lower than one atomic percent in a layer until a depth of 100 Å from the glass surface. This preferable case is shown in the present inventions 1 to 3. In this case, in comparison with a case in which the atomic concentration of potassium is higher than one atomic percent in the comparing examples 1 to 3, similar to the case of lead, potassium diffused from the glass interior can be efficiently confined within a small region in which the atomic concentration of potassium at a depth of 100 Å from the uppermost glass surface is equal to or lower than one atomic percent. Further, in this case, no potassium diffused from the glass interior is easily deposited to the glass exterior. Accordingly, similar to the case of lead, it is possible to more effectively restrain potassium from being melted and attached onto a die surface. As can be seen from the Table 1, no glass surface becomes opaque and no potassium is melted and attached to the die in the present inventions 1 to 3 each showing a potassium concentration equal to or lower than one atomic percent at a depth of 100 Å. In contrast to this, the glass surface becomes opaque and potassium is melted and attached to the die in the comparing examples 1 to 3 each showing a potassium concentration equal to or higher than one atomic percent so that no optical glass element is practical.

In the present invention, the optical glass element, has the above-mentioned effects after the hot press molding. However, the optical glass element may be used before the hot press molding. Concentrations of lead and potassium before the hot press molding are slightly changed in comparison with those after the hot press molding. If the concentrations of lead and potassium before the hot press molding are prescribed, these concentrations depend on a molding condition, especially, molding temperature and time. However, here, these concentrations on a lens surface are preferably prescribed at the stage of a product after the pressure molding. Therefore, no concentrations of lead and potassium depend on the molding condition of molding temperature and time, etc. Accordingly, a glass blank before molding must be designed in various kinds of molding conditions such that the concentrations of lead and potassium are equal to the above concentration values prescribed on a glass surface molding.

The present invention can be preferably applied to a case in which the above glass surface is coated with a coating film. In this case, the coating film can be formed on a glass surface having high transparency onto which no lead and potassium are attached. Accordingly, it is possible to solve the problems of separation of the coating film and an opaque glass surface caused when lead and potassium are attached onto the glass surface.

In the present invention, the above physical processing is very meaningful before molding processing. The thickness of a processed layer can be adjusted by the physical processing. Namely, a processing speed of the glass material can be increased and it is possible to prevent nitrate such as $KNO_3$, $Pb(NO_3)_2$ from being left on the glass surface.

In the present invention, the glass surface is preferably ground after the above pressure molding. In this case, an opaque portion can be removed from the glass surface even when the opaque portion is formed after the hot press molding. The opaque portion is constructed by a small opaque flaw, a coloring layer of lead and potassium, etc. Accordingly, it is possible to reuse a molding product deteriorated after the hot press molding.

Further objects and advantages of the present invention will be apparent from the following description of the preferred embodiments of the present invention as illustrated in the accompanying drawings.

BRIEF DESCRIPTION OF THE DRAWINGS

FIG. 2 is a graph for explaining the present invention in principle;

FIG. 7 is a graph showing concentration profiles of lead and potassium with respect to a depth from an uppermost glass surface of the optical glass element after the surface treatment in one embodiment of the present invention and hot press molding.

DESCRIPTION OF THE PREFERRED EMBODIMENTS

Figure 1A:
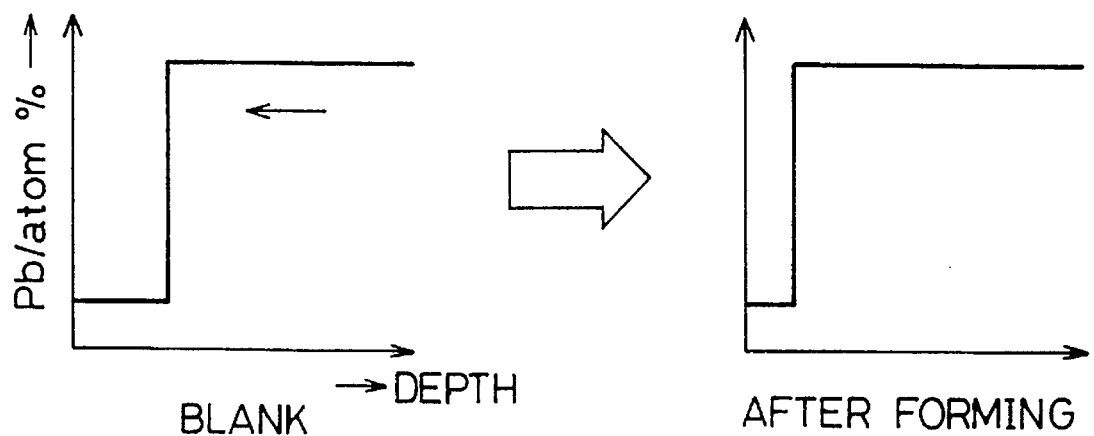
FIGS. 1a and 1b are graphs for explaining the present invention in principle.
Figure 1B:
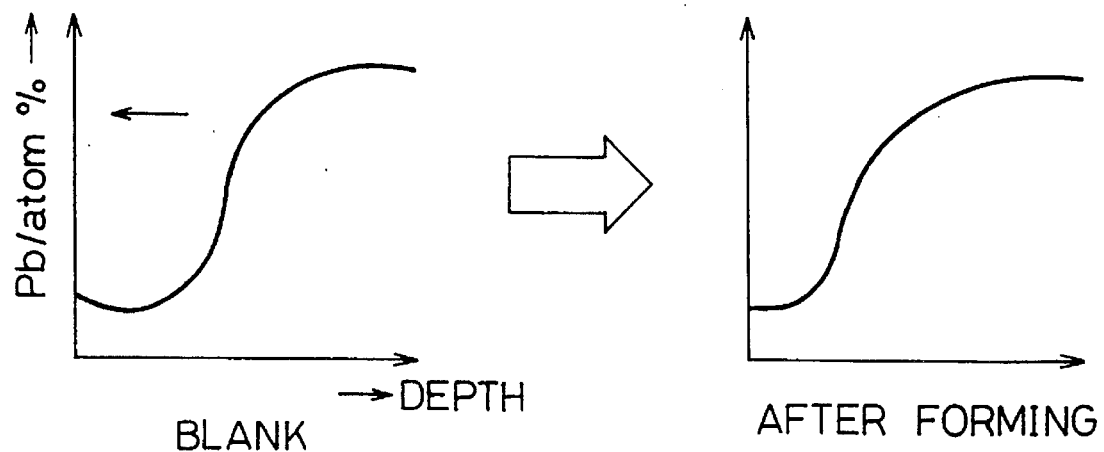

FIGS. 1 and 2 are graphs for explaining the present invention in principle. FIG. 1a shows an atomic concentration of lead with respect to a depth from a glass surface after general processings of hydrofluoric acid and nitric acid. FIG. 1a also shows an atomic concentration of lead with respect to a depth from a glass surface after a glass material obtained by this wet processing is molded. FIG. 1b shows an atomic concentration of lead with respect to a depth from a glass surface after ultrasonic processing in physical processing and nitric acid processing in chemical processing are simultaneously performed in the present invention. FIG. 1b also shows an atomic concentration of lead with respect to a depth from a glass surface after a glass material obtained by these processings in the present invention is molded. FIG. 2 is a graph showing an atomic concentration of lead with respect to a depth from a glass surface in each of processing conditions. In FIG. 2, curve M1 shows a case of the nitric acid and ultrasonic processings in the present invention. Curve M2 shows a case in which the glass material is molded after the nitric acid and ultrasonic processings with respect to the curve M1. Curve M3 shows a case in which the glass material is annealed after the nitric acid and ultrasonic processings with respect to the curve M1. Curve M4 shows a case in which glass is not processed. A condition of the nitric acid and ultrasonic processings with respect to the curve M1 and a molding condition with respect to the curve M2 are similar to those in embodiments described later.

In a general hot press molding method of glass, a die and glass come in contact with each other at a high temperature. Accordingly, in an optical glass including a glass component, especially, a lead component, lead is attached to the die and the die is deteriorated. Therefore, in a known molding method, the optical glass is coated with various kinds of coating films before molding. However, in this method, treatment processings are complicated and cost of the optical glass is increased so that this method is not practical. Japanese Patent Application Laying Open (KOKAI) No. 62-207728 discloses a method for forming a surface reforming layer such that the amount of a lead component in a surface portion of glass before molding is smaller than that in an internal portion of glass by processings of hydrofluoric acid and nitric acid.

However, in accordance with research results of the inventors in this patent application, as shown in FIG. 1a, an entire concentration of lead is moved toward a surface layer portion of glass after molding when the surface reforming layer is formed by reducing the lead component from the glass surface portion in the above method of Japanese Patent Application Laying Open (KOKAI) No. 62-207728. Further, the atomic concentration of lead is low only in the glass surface portion and is extremely high in the internal portion of glass in comparison with the glass surface portion. Accordingly, when this glass is thermally treated, a large amount of lead in the glass interior tends to be moved at one time toward the glass surface portion. Therefore, this surface reforming layer attains a very unstable state at a molding time although there are some effects of surface processing in comparison with a case in which there is no surface processing of glass. Accordingly, the lead concentration is partially changed so that lead is rapidly deposited finally between a die and this glass and is melted and attached to the die, thereby causing a problem. Further, when this surface reforming layer is reheated to remove distortions, etc. therefrom, or is annealed in a heat treatment process, a lens surface becomes white by deposition of the lead component. This white lens surface is disadvantageous.

In contrast to this, in the present invention, glass is simultaneously cleaned by an ultrasonic wave in physical processing and nitric acid in chemical processing. Accordingly, an atomic concentration of lead from a glass surface is provided by a gentle curve M1 shown in FIG. 2. The atomic concentration of lead has a lowest point in a range in which the depth of lead from a glass surface layer is ranged from 30 to 150 Å. Elusion of the lead component is expedited by the cleaning of the ultrasonic wave, but the ultrasonic wave violently vibrates a glass component in the glass surface layer and increases the temperature of an uppermost surface layer portion. Therefore, lead is moved at a very high speed in the vicinity of a surface layer portion. When the above processings are completed, such a constricted curve is formed by a difference in moving speed of lead between, the glass interior and the uppermost surface layer. Therefore, when the lead component is moved toward the glass surface layer at a molding (or annealing) time of glass, the lead component moved at one time toward the glass surface layer is stopped within the glass interior at a low lead concentration point in which an action as a pressure regulating value occurs. As a result, as shown by curve M2 (or M3) in FIG. 2, the lead concentration is slightly increased in a range in which the depth of lead from the glass surface layer is ranged from 30 to 600 Å. However, it is possible to restrain the lead component from being deposited onto the uppermost glass surface within the time of a molding cycle of about ten minutes. Further, it is possible to almost restrain lead from being deposited even when distortions are removed from the glass material and the glass material is annealed along curve M3 in thermal processing. Therefore, a burden to the die is reduced remarkably and it is possible to prevent glass from being suddenly melted and attached onto the die. Further, no complicated expensive processing such as coating is required with respect to glass before molding. Therefore, it is possible to simply restrain the die from being deteriorated.

The action of a suitable means applicable to the present invention and described in the above item of the solving means will next be described.

Lead is melted and attached to a glass press lens using flint glass in molding thereof since an ion of lead included in glass reacts to a die material as metallic lead by a reducing reaction on an interface of a molding die and a molded glass blank. Therefore, in a method for preventing such attachment, a layer lacking an ion of lead is formed in a surface portion of the glass blank. This method is generally composed of methods for forming reforming layers having different compositions in the glass interior, and a method for forming a film on a glass surface.

A method for eluting a lead ion from a surface portion of glass by an acid such as nitric acid is used as one of the above methods for forming reforming layers. Japanese Patent Application Laying Open (KOKAI) No. 62-207728 shows one example of this eluting method. In this example, a component such as Pb and Ba tending to be evaporated is removed from a blank surface portion of a glass press lens having a thickness thinner than 1000 Å by using processing of nitric acid or infrared heating. As shown in FIG. 1, a layer having a relatively high metallic concentration is formed in an uppermost surface portion having a thickness equal to or thinner than 50 Å. This layer is continuously connected to a concentration gradient layer in which the metallic concentration is gradually changed. Such a distribution of the metallic concentration is formed to prevent lead from being melted and attached to a die and improve the adhesion of a coating film. Japanese Patent Application Laying Open (KOKAI) No. 3-252321 shows a technique for forming a hydrating layer by processing a material surface of flint glass using an acid such as nitric acid, acetic acid or hydrochloric acid.

For example, the above method for forming a film on a glass surface is shown in Japanese Patent Application Laying Open (KOKAI) No. 3-265547. In this method, dipping and cleaning are performed by a acid solution of phosphoric acid or a solution obtained by adding hydrofluoric acid or hydrofluosilic acid to this solution of phosphoric acid in accordance with necessity when float glass is coated with a metallic coating film, thereby increasing adhesive force of the coating film.

Figure 6:
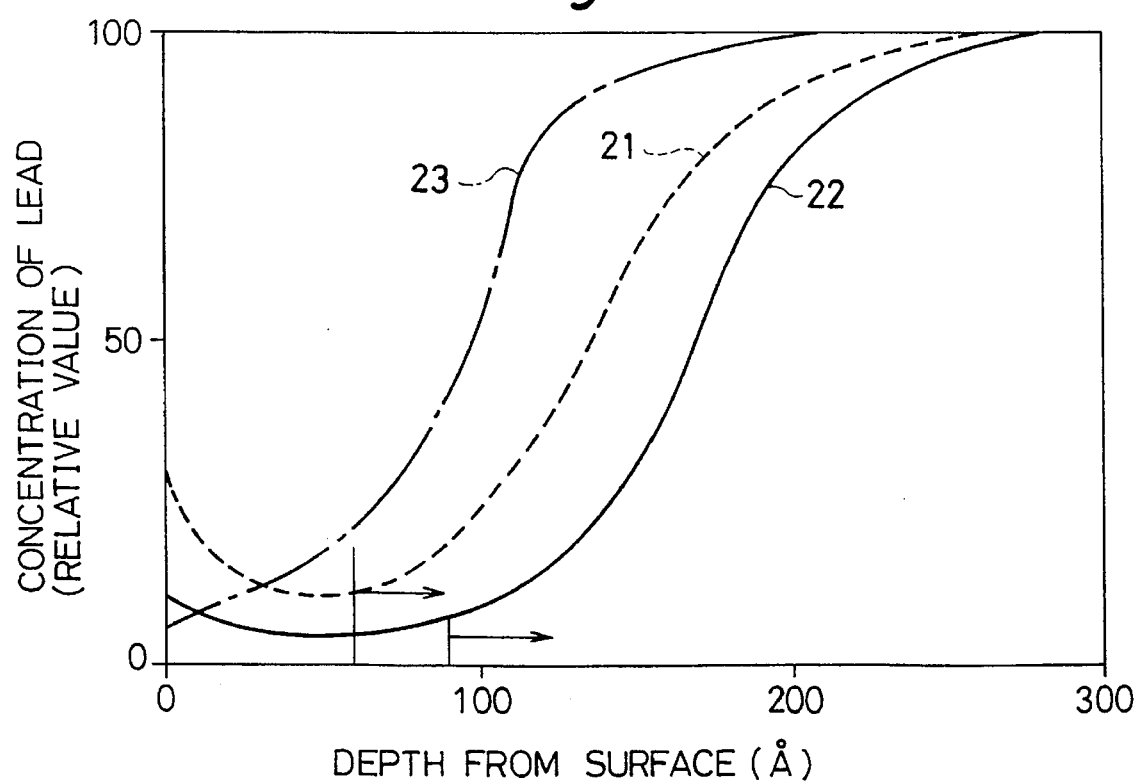
FIG. 6 is a graph showing a relation between a distribution of an ion concentration of lead and a depth in a glass material.

In hot press molding of glass, the quality of a molded lens is most greatly influenced by an ion concentration of lead in a region of the lead ion until approximately 100 Å as described later with reference to FIG. 6. Accordingly, in the forming method of a reforming layer for simply forming an ion eluting layer by dipping, a modificative ion is attached to the die in this region so that the lens quality, especially, transparency of the lens and a life of the die are reduced.

Therefore, in the present invention, an ultrasonic wave is used to expedite a reaction of glass by increasing a glass temperature in a region until a thickness of 100 Å from a glass blank surface. Heat is generated by a cavitation generated by the ultrasonic wave on an interface of this glass and a solution. The elution of an ion is extremely expedited by this heat. A metallic concentration can be extremely reduced by an acid in the region until 100 Å. This action will next be explained concretely.

As explained above, a glass blank of the above glass material for press molding is preferably processed by an ultrasonic wave in an acid solution. Further, the forming reaction of a reforming layer is preferably expedited by increasing a temperature of the glass material in a region until a thickness of 100 Å from a glass blank surface. In this case, it is possible to obtain a press-molded lens having a high quality in which no transmittance of the lens is reduced. Thus, the life of a molding die can be greatly extended.

The reforming layer is preferably formed in the above glass material for hot press molding by forming an ionic eluting layer in which the glass blank lacks a modificative ion. Accordingly, in addition to the above common effects, it is possible to restrain a modificative ion of lead, etc. from being diffused on an interface of the die and glass at hot press molding times.

In the above glass material for hot press molding, the ion eluting layer is preferably formed by a low ion concentration layer having a concentration of the modificative ion equal to or lower than 10% of bulk and a thickness from 50 to 150 Å, and a concentration gradient layer having a thickness from 150 to 300 Å and recovered until a metallic concentration of bulk. In this case, in addition to the above common effects, it is possible to extremely reduce a diffusive amount of lead diffused onto the interface of the die and glass.

The above glass material for hot press molding is processed by an ultrasonic wave in hydrogen oxide using acid aqueous solutions such as nitric acid, sulfuric acid, hydrochloric acid, acetic acid. In this case, in addition to the above common effects, an exchange reaction of a hydronium ion and a modificative ion in a region until 100 Å from a glass surface is accelerated so that it is possible to obtain a lens having a high transfer accuracy.

After the above glass material for hot press molding is once processed by an ultrasonic wave, a reforming layer is preferably formed by adding the ultrasonic processing in an alkali aqueous solution such as sodium hydroxide, potassium hydroxide. In this case, in addition to the above common effects, salt of a modificative ion reattached to a glass surface can be effectively removed therefrom and a concentration of the modificative ion in the reforming layer can be further reduced.

A laser beam is preferably irradiated onto the above glass material for hot press molding instead of the ultrasonic processing. In this case, in addition to the above common effects, an exchange reaction of a modificative ion and a hydronium ion can be accelerated by increasing an atmospheric temperature in the vicinity of a glass surface. Thus, it is possible to obtain a lens having a high quality.

Concrete Embodiments of the present invention will next be described with reference to the accompanying drawings.

Embodiment 1

Figure 3:
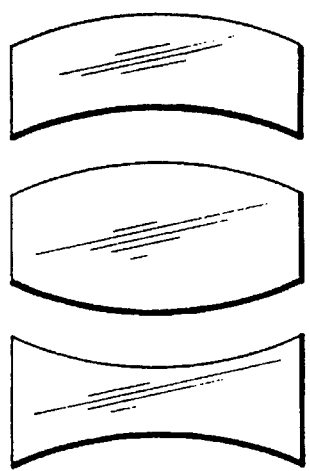
FIG. 3 is a view showing one example of an optical glass element in accordance with Embodiment 1 of the present invention.
Figure 4:
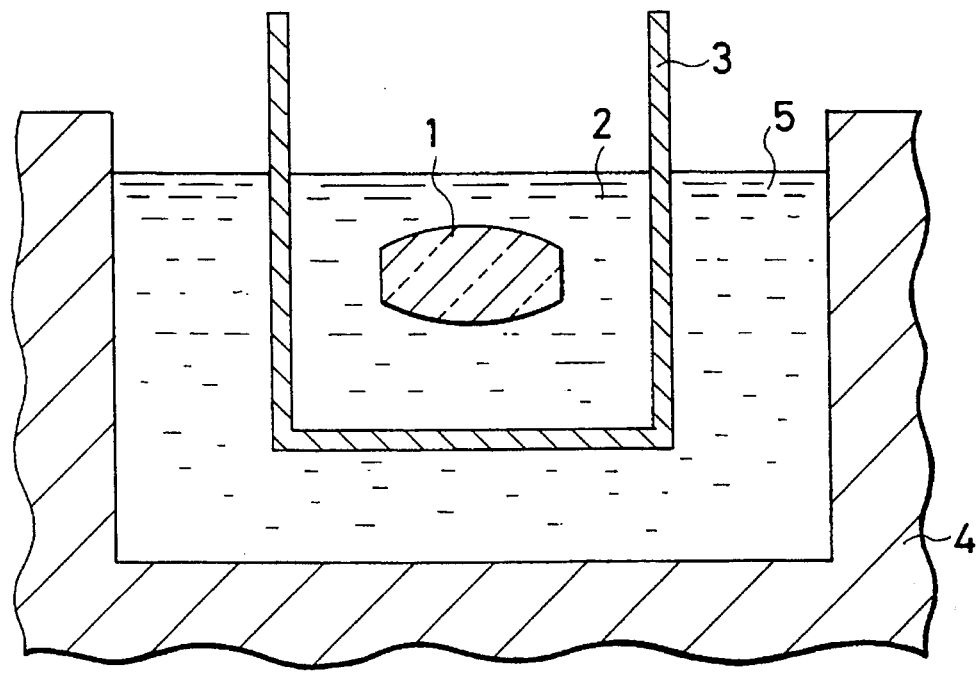
FIG. 4 is a view for explaining a surface treatment process in accordance with the Embodiment 1 of the present invention.

FIG. 3 is a view showing one example of an optical glass element (nitric acid SF11) in accordance with the Embodiment 1. FIG. 4 is a view for explaining a surface treatment process in accordance with one embodiment of the present invention. In FIG. 4, reference numeral 1 designates a lead glass to be processed with respect to a surface thereof. Reference numeral 2 designates an aqueous solution of nitric acid for processing the surface of the lead glass 1. This lead glass 1 and the aqueous solution 2 of nitric acid are stored within a container 3. An ultrasonic processor 4 is filled with water.5. The container 3 having the lead glass 1 and the aqueous solution 2 of nitric acid is stored into this water 5 within the ultrasonic processor 4.

A method for manufacturing the above optical glass element will next be explained.

First, an aqueous solution 2 of nitric acid of 1 mol is made by pure water and EL-class nitric acid and is stored into the container 3. An SF11 lead glass 1 to be processed with respect to a surface thereof is then arranged within the container 3. The container 3 having this glass 1 and the aqueous solution 2 of nitric acid is arranged within water 5 filled into the ultrasonic processor 4. Next, the glass surface is processed while ultrasonic processing is performed for 15 minutes. Subsequently, this glass is cleaned by pure water so that the glass surface is completely processed. At this time, eleven coefficients $A0$ to $A10$ in the above-mentioned formula (1) showing the distribution of a lead component are provided as follows in the case of example 1.

Example 1 (in which all of the coefficients are approximated until a tenth order)

$A0 = 5.93 \times 10^{-1}$ $A1 = -2.24 \times 10^{-2}$ $A2 = 5.65 \times 10^{-4}$ $A3 = -7.40 \times 10^{-6}$ $A4 = 6.31 \times 10\hat{0}-8$ $A5 = -3.23 \times 10^{-10}$ $A6 = 1.01 \times 10^{-12}$ $A7 = 1.96 \times 10^{-15}$ $A8 = 2.29 \times 10^{-18}$ $A9 = -1.49 \times 10^{-21}$ $A10 = 4.11 \times 10^{-25}$ $$Y = A0 + A1 \times X + A2 \times X^2 + A3 \times X^3 + A4 \times X^4 +$$
$$A5 \times X^5 + A6 \times X^6 + A7 \times X^7 + A8 \times X^8 +$$
$$A9 \times X^9 + A10 \times X^{10}$$

In this formula, Y designates an atomic concentration of lead shown by atomic percent, Reference numeral X designates a depth from an uppermost glass layer. Each of the coefficients $A0$ to $A10$ is set to a constant. Symbol $\hat{0}$ represents a power, Example 2 (in which the coefficients are approximated until a fourth order)

$A0 = 4.54 \times 100^{-1}$ $A1 = -8.78 \times 10^{-3}$ $A2 = 1.23 \times 10^{-4}$ $A3 = -2.26 \times 10^{-7}$ $A4 = 1.68 \times 10^{-10}$ $Y = A0 + A1 \times X + A2 \times X^2 + A3 \times X^3 + A4 \times X^4$ In this formula, Y designates an atomic concentration of lead shown by atomic percent, Reference numeral X designates a depth from an uppermost glass layer. Each of the coefficients $A0$ to $A4$ is set to a constant. Symbol represents a power.

As mentioned above, there is a case in which the atomic concentration of lead can be extremely approximated even when an approximate curve is provided by setting coefficients $A5$ to $A10$ to zero. Accordingly, the atomic concentration of lead can be sufficiently approximated even when no polynomial until the tenth order is necessarily provided. Further, as shown in FIG. 2, a glass portion having a lowest concentration of lead is provided by this surface treatment in a range from 30 to 150 pq' r. No glass portion having the lowest lead concentration is formed at a depth equal to or deeper than 150 Å even when the lead concentration and a processing time are increased. Table 2 shows evaluated results of a die and a molded lens on the basis of the lead concentration and a deepest depth at this lead concentration.

TABLE 2

|  |  | DEPTH (Å) | Pb/atom (%) | MOLD'S SURFACE | LENS' SURFACE | LENS' SURFACE AFTER HEAT TREATMENT | TOTAL EVALUATION |
| --- | --- | --- | --- | --- | --- | --- | --- |
| EXAMPLE (Invention) | 1 | 50 | 0.2 | preferable | preferable | preferable | good |
|  | 2 | 100 | 0.2 | preferable | preferable | preferable | good |
|  | 3 | 150 | 0.2 | preferable | preferable | preferable | good |
|  | 4 | 50 | 0.4 | preferable | preferable | preferable | good |
|  | 5 | 100 | 0.4 | preferable | preferable | preferable | good |
|  | 6 | 150 | 0.4 | preferable | preferable | preferable | good |
| COMPARATIVE EXAMPLE | 1 | 20 | 0.2 | fusion | rough | opaque | bad |
|  | 2 | 20 | 0.4 | slightly fusion | partially bad | opaque | bad |
|  | 3 | 20 | 0.6 | fusion | rough | opaque | bad |
|  | 4 | 50 | 0.6 | fusion | rough | opaque | bad |
|  | 5 | 100 | 0.6 | fusion | rough | opaque | bad |
|  | 6 | 150 | 0.6 | fusion | rough | opaque | bad |

As can be seen from Table 2, the die and the lens are melted and attached to each other and a lens surface becomes rough and opaque after heat treatment when the depth of a glass material from a glass surface layer and the atomic concentration of lead are respectively set to 20 Å and 0.2% in comparing example 1, 20 Å and 0.4% in comparing example 2, 20 Å and 0.6% in comparing example 3, 50 Å and 0.6% in comparing example 4, 100 Å and 0.6% in comparing example 5, and 150 Å and 0.6% in comparing example 6. In contrast to this, in the present invention, states of a die surface and a lens surface and the lens after the heat treatment are preferable when the depth of a glass material from a glass surface layer and the atomic concentration of lead are respectively set to 50 Å and 0.2% in the present invention 1, 10 Å and 0.2% in the present invention 2, 150 Å and 0.2% in the present invention 3, 50 Å and 0.4% in the present invention 4, 100 Å and 0.4% in the present invention 5, and 150 Å and 0.4% in the present invention 6.

After the surface treatment, the above glass material is pressurized and molded in a condition of molding temperature 510° C., pressure 200 kg/cm² and pressurizing time one minute. Thus, a molding product of the optical glass element having a desirable shape is formed. At this time, a lead atom after molding is moved by 80 Å at its maximum toward a glass surface layer as shown by curve M1 to curve M2 in FIG. 2. In this embodiment, after 500 moldings, surface roughness of the die is equal to RMAX=0.01 μm. Accordingly, there is no phenomenon in the general manufacturing method in which lead is suddenly melted and attached to the die. Further, as shown by curve M3 in FIG. 2, a lead atom is moved by 120 Å at its maximum even when the glass material is annealed to remove distortions therefrom. The lead concentration of the glass surface layer is equal to or lower than 0.8 atomic percent by effects similar to those of a pressure regulating value in which rapid deposition of a lead component is restrained by a low lead concentration portion. Accordingly, no glass surface becomes opaque in this embodiment.

Figure 5A:
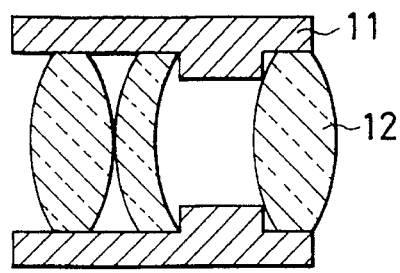
FIGS. 5a and 5b are views showing an application example of an optical system applicable to the present invention.
Figure 5B:
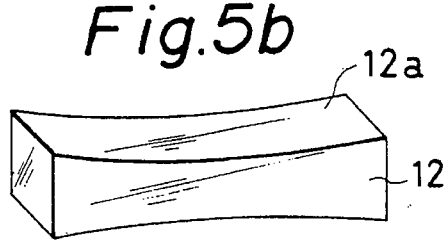

FIGS. 5a and 5b are views showing an application example of an optical system to which the present invention can be applied. FIG. 5a shows one example of an optical unit in which an optical glass element 12 of the present invention is arranged in a cell 11. FIG. 5b shows one example of an optical mirror in which a light reflecting face 12a of the optical glass element 12 of the present invention is coated with a thin film made of aluminum.

Embodiment 2

In process 1, a glass blank is arranged in an aqueous solution of nitric acid of 20% and is processed by an ultrasonic wave for 15 minutes.

In process 2, the processed glass material is cleaned by superclean water for 30 seconds.

In process 3, the cleaned material is dried in an atmosphere of nitrogen.

In process 4, the dried material is pressed and molded for one minute at temperature 525° C. and pressure 100 kg/cm².

In the process 1, mutual diffusive speeds of hydrogen and lead ions are accelerated by heat of a cavitation caused by using the ultrasonic wave until a depth of about 100 Å from a glass blank surface. An ion eluting layer is formed by a low ion concentration layer having a thickness from 50 to 150 Å and a modificative ion concentration equal to or lower than 10% of bulk, and a concentration gradient layer having a thickness from 150 to 300 Å and recovered until a metallic concentration of bulk. As a result, as shown by curve 22 in FIG. 6, a layer having a very low lead ion concentration is formed in comparison with that in a normal dipping method shown by curve 21 in FIG. 6. When this layer having a very low lead ion concentration is formed, an amount of lead supplied by diffusion on an interface of the glass material in hot press molding can be restrained and set to a very low amount as shown by curve 23 in FIG. 6. Accordingly, it is possible to provide a lens having high quality and transmittance in comparison with a case in which ultrasonic wave is not used. A frequency of the ultrasonic wave is adjusted such that the cavitation is efficiently generated.

Embodiment 3

In process 1, a glass blank is arranged in an aqueous solution of nitric acid of 20% and is processed by an ultrasonic wave for 15 minutes.

In process 2, the processed glass material is cleaned by superclean water for 30 seconds.

In process 3, the glass material is processed by an ultrasonic wave for one minute by using an aqueous solution of sodium hydroxide having pH 10.

In process 4, the glass material is cleaned by superclean water for 30 seconds.

In process 5, the cleaned material is dried in an atmosphere of nitrogen.

In process 6, the dried material is pressed and molded for one minute at temperature 525° C. and pressure 100 kg/cm².

In this Embodiment 3, the processes 3 and 4 are added to the above processes in the Embodiment 2. In the process 3, an entire frame of silicon oxide is removed from the glass material in a layer having a relatively high metallic concentration on an uppermost surface of the glass blank so that a lens having a high quality is obtained. In this process 3, similar effects can be obtained by using hydrogen fluoride of 10% instead of an aqueous solution of sodium hydroxide.

However, sodium hydroxide is more effective in consideration of difficulty of handling and precipitation of alkali salt of hydrofluosilic acid.

Embodiment 4

In process 1, an aqueous solution of hydrogen peroxide of 10% is added to nitric acid of 20% and a glass blank is arranged in this aqueous solution and is processed by an ultrasonic wave for 15 minutes.

In process 2, the processed glass material is cleaned by superclean water for 30 seconds.

In process 3, the cleaned material is dried in an atmosphere of nitrogen.

In process 4, the dried material is pressed and molded for one minute at temperature 525° C. and pressure 100 kg/cm$^2$.

In this Embodiment 4, a composition of the aqueous solution for dipping the glass blank in the process 1 of the Embodiment 2 is changed. An interface of the glass material is activated by using hydrogen peroxide as an oxidizing agent so that a metallic concentration in the layer of a metallic ion can be further reduced.

Embodiment 5

In process 1, an aqueous solution of hydrogen fluoride of 10% is added to nitric acid of 20% and a glass blank is arranged in this aqueous solution and is processed by an ultrasonic wave for 15 minutes.

In process 2, the processed glass material is cleaned by superclean water for 30 seconds.

In process 3, the cleaned material is dried in an atmosphere of nitrogen.

In process 4, the dried material is pressed and molded for one minute at temperature 525° C. and pressure 100 kg/cm$^2$.

In this Embodiment 5, a small amount of hydrogen fluoride is mixed with nitric acid when an eluting layer is formed by using an acid in the Embodiment 2. Thus, it is possible to restrain nitrate from being adsorbed onto a glass surface.

Embodiment 6

In process 1, a YAG laser beam is irradiated onto a glass material for molding in an aqueous solution of nitric acid of 20%.

In process 2, the irradiated glass material is cleaned by superclean water for 30 seconds.

In process 3, the cleaned material is dried in an atmosphere of nitrogen.

In process 4, the dried material is pressed and molded for one minute at temperature 525° C. and pressure 100 kg/cm$^2$.

In this Embodiment 6, an atmospheric temperature in the vicinity of a glass blank surface is increased by irradiating the laser beam onto the glass material. Thus, an exchange reaction of a modificative ion and a hydronium ion can be accelerated.

Embodiment 7

First, a glass blank (nitric acid SF8) is ground such that a glass lens approximately has a desirable aspherical shape. A surface of the glass blank is then processed as follows before hot press molding. In the surface processing, the glass blank is processed by an ultrasonic wave for 20 minutes by using an aqueous solution of nitric acid of 0.5 mol. Thereafter, the glass blank is then cleaned by water and is dried by blowing of nitrogen. Next, such a processed glass blank is arranged on a lower die of a pair of dies set in a press molding device. An atmosphere around the dies is replaced with nitrogen. The glass blank is then heated, pressed and molded for 50 seconds in a condition of temperature 500° C. and pressure 60 kg/cm$^2$. Thereafter, the glass blank is gradually cooled until 400° C. and is rapidly cooled and is taken out of a forming chamber as an optical glass element at temperature 150° C. Next, this optical glass element is set in an evaporation device and is coated with a film of MgF$_2$ having a thickness of about 1500 Å, thereby forming a product of the optical glass element. Concentration profiles of lead and potassium are measured by ESCA or XTS with respect to a depth of the optical glass element from an uppermost glass surface thereof after the surface processing and the hot press molding. FIG. 7 shows measured results of the concentration profiles. As shown in FIG. 7, atomic concentrations of lead and potassium can be set to be equal to or lower than one atomic percent in a glass layer until a depth of 100 Å from the uppermost glass surface after the surface processing and the hot press molding. After the hot press molding, the atomic concentration of lead can be set to be equal to or lower than 0.5 atomic percent in a glass layer until a depth of 50 Å from the uppermost glass surface. In the general manufacturing method, a surface of the glass material is simply processed by a solvent such as hydrofluoric acid so that a glass surface becomes opaque. In contrast to this, in this Embodiment 7, no glass surface becomes opaque and no glass is melted and attached to a die when the glass material is processed by an ultrasonic wave in a solvent. Further, no antireflection film of MgF$_2$ is separated from the glass surface and no glass surface becomes opaque when a glass lens is used.

Many widely different embodiments of the present invention may be constructed without departing from the spirit and scope of the present invention. It should be understood that the present invention is not limited to the specific embodiments described in the specification, except as defined in the appended claims.

What is claimed is:

1. A glass material comprising an uneven distribution of lead, wherein the concentration of lead in a 120 Å thick low concentration region of said glass material is lower than the concentration of lead in all other regions of said glass material, said low concentration region located in a portion of said glass material which does not include the surface thereof.

2. The glass material as claimed in claim 1, wherein the concentration of lead in said low concentration region is less than or equal to 2 atomic percent.

3. A glass material comprising an uneven distribution of potassium, wherein the concentration of potassium in a 70 Å thick low concentration region of said glass material is lower than the concentration of potassium in all other regions of said glass material, said low concentration region located in a portion of said glass material which does not include the surface thereof.

4. The glass material as claimed in claim 3, wherein the concentration of potassium in said low concentration region is less than or equal to 1.5 atomic percent.

5. The glass material as claimed in claim 1, wherein said low concentration region is located 30 Å underneath the surface of said glass material.

6. The glass material as claimed in claim 2, wherein said low concentration region is located 30 Å underneath the surface of said glass material.

7. The glass material as claimed in claim 3, wherein said low concentration region is located 30 Å underneath the surface of said glass material.

8. The glass material as claimed in claim 4, wherein said low concentration region is located 30 Å underneath the surface of said glass material.

* * * * *